US011256733B2

(12) United States Patent
Cannon et al.

(10) Patent No.: US 11,256,733 B2
(45) Date of Patent: Feb. 22, 2022

(54) USER SUPPORT WITH INTEGRATED CONVERSATIONAL USER INTERFACES AND SOCIAL QUESTION ANSWERING

(71) Applicant: INTUIT INC., Mountain View, CA (US)

(72) Inventors: Matthew Cannon, San Diego, CA (US); Igor A. Podgorny, San Diego, CA (US); Yason Khaburzaniya, Seattle, WA (US); Jeff W. Geisler, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/100,518

(22) Filed: Nov. 20, 2020

(65) Prior Publication Data

US 2021/0081443 A1    Mar. 18, 2021

Related U.S. Application Data

(62) Division of application No. 16/569,917, filed on Sep. 13, 2019, now Pat. No. 10,878,008.

(51) Int. Cl.
| | |
|---|---|
| *G06F 16/332* | (2019.01) |
| *G06F 9/451* | (2018.01) |
| *G06F 16/338* | (2019.01) |
| *G06F 16/33* | (2019.01) |
| *G06N 3/08* | (2006.01) |

(52) U.S. Cl.
CPC .......... *G06F 16/3329* (2019.01); *G06F 9/453* (2018.02); *G06F 16/338* (2019.01); *G06F 16/3331* (2019.01); *G06N 3/08* (2013.01)

(58) Field of Classification Search
CPC ............................ G06F 16/3329; G06F 9/453
See application file for complete search history.

(56) References Cited

U.S. PATENT DOCUMENTS 9,449,091 B1 *   9/2016  Rao ................... G06Q 30/0271
9,466,294 B1 *  10/2016  Tunstall-Pedoe ... G06F 16/3329
(Continued)

OTHER PUBLICATIONS

I. Podgorny, Y. Khaburzaniya, and J. Geisler. 2019. Conversational Agents and Community Question Answering. In CHI 2019 Workshops, Glasgow, United Kingdom, May 2019 (CHI'19), 6 pages.
(Continued)

*Primary Examiner* — Daniel Rodriguez
(74) *Attorney, Agent, or Firm* — Patterson + Sheridan, LLP

(57) ABSTRACT

Certain aspects of the present disclosure provide techniques for providing assistance to users by integrating social computing system with conversational user interface. In some cases, a user interacting with a virtual assistant of a conversational user interface provides input that the virtual assistant is not able identify a matching intent. As a result, the virtual assistant can leverage the social computing system to generate a new question based on the user input and post the question to the social computing system. Users of the social computing system can provide an answer, which the virtual assistant provides to the user in the conversational user interface. The social computing system can also generate a new intent for the virtual assistant to increase efficiency of the virtual assistant.

20 Claims, 6 Drawing Sheets

(56) References Cited

U.S. PATENT DOCUMENTS

| | | | |
|---|---|---|---|
| 10,152,970 B1 | 12/2018 | Olabiyi et al. | |
| 10,958,599 B1* | 3/2021 | Penov | G10L 15/02 |
| 2005/0203878 A1* | 9/2005 | Brill | G06F 16/9535 |
| 2008/0154877 A1* | 6/2008 | Joshi | G06F 16/332 |
| 2010/0153094 A1* | 6/2010 | Lee | G06F 16/3329 704/9 |
| 2011/0029541 A1* | 2/2011 | Schulman | G06F 16/951 707/748 |
| 2011/0153322 A1* | 6/2011 | Kwak | G10L 15/22 704/235 |
| 2011/0289063 A1* | 11/2011 | Radlinski | G06Q 30/00 707/706 |
| 2013/0304758 A1* | 11/2013 | Gruber | G06F 16/248 707/769 |
| 2014/0119531 A1* | 5/2014 | Tuchman | H04M 3/5166 379/265.09 |
| 2014/0207622 A1* | 7/2014 | Vijayaraghavan | G06F 16/951 705/26.62 |
| 2014/0214818 A1* | 7/2014 | Du | G06Q 10/101 707/723 |
| 2014/0272909 A1* | 9/2014 | Isensee | G09B 7/02 434/362 |
| 2014/0280087 A1* | 9/2014 | Isensee | G06F 16/3329 707/723 |
| 2014/0297571 A1* | 10/2014 | Beamon | G06F 16/313 706/12 |
| 2014/0324757 A1* | 10/2014 | Tabrizi | G06F 3/0484 706/50 |
| 2014/0377735 A1* | 12/2014 | Byron | G09B 7/00 434/362 |
| 2015/0161230 A1* | 6/2015 | Alkov | G06F 16/24578 707/737 |
| 2015/0317383 A1* | 11/2015 | Alkov | H04L 51/04 707/738 |
| 2015/0348107 A1* | 12/2015 | Wu | G06F 16/951 705/14.54 |
| 2016/0071517 A1* | 3/2016 | Beaver | G10L 15/22 704/9 |
| 2016/0099892 A1* | 4/2016 | Palakovich | H04L 51/02 709/206 |
| 2016/0110422 A1* | 4/2016 | Roytman | G06N 5/00 706/12 |
| 2016/0112212 A1* | 4/2016 | Tabrizi | H04L 12/1822 715/756 |
| 2016/0196336 A1* | 7/2016 | Allen | G06F 16/9535 707/734 |
| 2016/0217472 A1* | 7/2016 | Podgorny | G06Q 40/123 |
| 2017/0026318 A1* | 1/2017 | Daniel | H04L 51/046 |
| 2017/0132228 A1* | 5/2017 | Baughman | H04L 51/32 |
| 2017/0277993 A1* | 9/2017 | Beaver | G06F 40/40 |
| 2017/0310613 A1* | 10/2017 | Lalji | H04L 67/20 |
| 2017/0337261 A1* | 11/2017 | Wang | G06F 40/30 |
| 2018/0103004 A1* | 4/2018 | Demir | H04L 51/32 |
| 2018/0131645 A1* | 5/2018 | Magliozzi | G06F 40/30 |
| 2018/0144046 A1* | 5/2018 | Braga | G06F 16/3329 |
| 2018/0181648 A1* | 6/2018 | Chen | G06F 16/338 |
| 2018/0191643 A1* | 7/2018 | Berry | H04L 51/046 |
| 2018/0225382 A1* | 8/2018 | Crabtree | G06F 16/367 |
| 2018/0232376 A1 | 8/2018 | Zhu et al. | |
| 2018/0307687 A1* | 10/2018 | Natkin | G06F 16/24578 |
| 2019/0034522 A1* | 1/2019 | Kim | G10L 15/22 |
| 2019/0108273 A1* | 4/2019 | Li | G06F 16/35 |
| 2019/0204907 A1* | 7/2019 | Xie | A63F 13/424 |
| 2019/0303473 A1* | 10/2019 | Sen | G06F 16/2425 |
| 2019/0317994 A1* | 10/2019 | Singh | G06F 40/30 |
| 2019/0354594 A1* | 11/2019 | Foster | G06F 40/35 |
| 2020/0050942 A1* | 2/2020 | Sun | G06F 40/40 |
| 2020/0089780 A1* | 3/2020 | Peterson | G06F 16/2455 |
| 2020/0117858 A1* | 4/2020 | Freeman | G06F 40/35 |
| 2020/0142888 A1* | 5/2020 | Alakuijala | G06N 3/08 |
| 2020/0167325 A1* | 5/2020 | Carvalho | G06F 16/2455 |
| 2020/0184156 A1* | 6/2020 | Badr | G06F 9/541 |
| 2020/0259891 A1* | 8/2020 | Abraham | G06F 16/3329 |
| 2020/0285660 A1* | 9/2020 | Kim | G10L 15/22 |
| 2020/0336442 A1* | 10/2020 | Snell | G06Q 30/0255 |
| 2020/0356604 A1* | 11/2020 | MacDougall | G06F 16/9024 |
| 2020/0364511 A1* | 11/2020 | Brown | G06F 40/30 |
| 2021/0067470 A1* | 3/2021 | Freed | H04L 51/30 |

OTHER PUBLICATIONS

Christian Buck, Jannis Bulian, Massimiliano Ciaramita, Wojciech Gajewski, Andrea Gesmundo, Neil Houlsby, Wei Wang. 2018. Ask the Right Questions: Active Question Reformulation with Reinforcement Learning, arXiv:1705.07830.

Miguel Coronado, Carlos A. Iglesias and Alberto Mardomingo. 2015. A Personal Agents Hybrid Architecture for Question Answering featuring Social Dialog, In: International Symposium on Innovations in Intelligent Systems and Applications.

Kelvin Guu, Tatsunori B. Hashimoto, Yonatan Oren, Percy Liang. 2017. Generating Sentences by Editing Prototypes, arXiv:1709.08878.

Robert E. Kraut, Paul Resnick. 2012. Building successful online communities: Evidence-based social design, Cambridge, MIT Press.

Igor A. Podgorny, Chris Gielow, Matthew Cannon, Todd Goodyear. 2015. Real time detection and intervention of poorly phrased questions. In: CHI'15 Extended Abstracts, 2205-2210.

Igor A. Podgorny, Chris Gielow. 2018. Semi-automated prevention and curation of duplicate content in social support systems. In: Joint Proceedings of the ACM IUI 2018 Workshops.

Iulian V. Serban, Alessandro Sordoni, Yoshua Bengio, Aaron Courville, Joelle Pineau. 2015. Building End-to-End Dialogue Systems Using Generative Hierarchical Neural Network Models, arXiv:1507.04808.

Ivan Srba, Mária Bieliková. 2016. A Comprehensive Survey and Classification of Approaches for Community Question Answering. In: TWEB, 10 (3), 18:1-18:63.

Sainbayar Sukhbaatar, Arthur Szlam, Jason Weston, Rob Fergus. 2015. End-To-End Memory Networks, arXiv:1503.08895.

Ilya Sutskever, Oriol Vinyals, Quoc V Le. 2014. Sequence to sequence learning with neural networks. In: Advances in NIPS, 3104-3112.

Jun Yin, Xin Jiang, Zhengdong Lu, Lifeng Shang, Hang Li, Xiaoming Li. 2015. Neural Generative Question Answering, arXiv:1512.01337.

Steve Young, Milica Gašic, Blaise Thomson, JD Williams. 2013. POMDP-based statistical spoken dialog systems: A review. IEEE 101(5):1160-1179.

PCT/US2020/036598, International Search Report and Written Opinion dated Sep. 28, 2020, 14 pages.

Pararth Shat et al., Building a Conversational Agent Overnight with Dialogue Self-Play, Arxiv.Org, Cornell University Library, Jan. 15, 2018, XP081206735, 11 pages.

* cited by examiner

USER SUPPORT WITH INTEGRATED CONVERSATIONAL USER INTERFACES AND SOCIAL QUESTION ANSWERING

CROSS-REFERENCE TO RELATED APPLICATION(S)

This application is a divisional of pending U.S. patent application Ser. No. 16/569,917, filed on Sep. 13, 2019, which is herein incorporated by reference in its entirety.

INTRODUCTION

Aspects of the present disclosure relate to a method and system for providing assistance to users by integrating conversational user interfaces and social question answering (or community question answering) services.

BACKGROUND

Organizations implement a variety of support services to assist users of products and/or services offered by that organization. One such support service is a conversational user interface that organizations implement in order to assist users as well as enhance user experience with the product and/or service (e.g., a software program product). Conversational user interfaces include a custom trained virtual assistant that reduces the burden on customer support by processing questions without human involvement.

However, despite implementing conversational user interfaces with virtual assistants, some users may not get the support requested. While virtual assistants are trained to provide support to users, virtual assistants are not trained for every possible question or set of circumstances because the training of virtual assistants for every such question or circumstance can be time and resource consuming. Additionally, training a virtual assistant for every known and unknown question and/or circumstance is not possible. As a result, when a user has an uncommon question or struggles to articulate a question, the virtual assistant may not be able to provide the support request. The failure of a virtual assistant is also referred to as a fallback, where the virtual assistant, having failed to provide assistance, directs the user to a human support agent.

Users that are not able to get assistance from a virtual assistant of a conversational user interface may reach out to a live support agent for assistance, defeating the purpose at least in part of implementing a conversational user interface. Additionally, failure of the virtual assistant to provide assistance to users is a strain on resources of an organization and can result in a negative user experience with not only the support service but also with the product and/or service as well as the organization.

Therefore, a solution is needed to train a virtual assistant of a conversational user interface to reduce the number of fallback instances without straining the resources of an organization.

BRIEF SUMMARY

Certain embodiments provide a method for providing support assistance to users with a conversational user interface integrated with social question answering. The method generally includes providing a conversational user interface. The method further includes receiving input data from the user. The method further includes determining the input data does not match any phrase in an intent for responding to the user. The method further includes generating a question from the input data with a generative question model based on a deep learning algorithm. The method further includes determining the generated question does not match a previously generated question stored in a question database. The method further includes providing the generated question to display in a social computing system for a plurality of other users. The method further includes retrieving an answer corresponding to the generated question from the social computing system. The method further includes providing the answer to the user in the conversational user interface.

Certain embodiments provide a method for generating an intent for a virtual assistant. The method generally includes receiving an indication that a virtual assistant integrated with a social computing system is not able to respond to a user. The method further includes obtaining input data from the user interacting with the virtual assistant and a set of generated content that includes a set of questions and a set of answers stored in the social computing system. The method further includes determining, based on the set of questions, a group of similar questions that includes the input data. The method further includes identifying an answer from the set of answers corresponding to the group of similar questions. The method further includes generating an intent for the virtual assistant by associating the answer with the group of similar questions.

Other embodiments provide systems configured to perform the aforementioned methods for providing support assistance to users with a conversational user interface integrated with social question answering and generating an intent for a virtual assistant, as well as non-transitory computer-readable storage mediums comprising instructions that, when executed by a processor, cause the processor to perform methods for providing support assistance to users with a conversational user interface integrated with social question answering and generating an intent for a virtual assistant.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
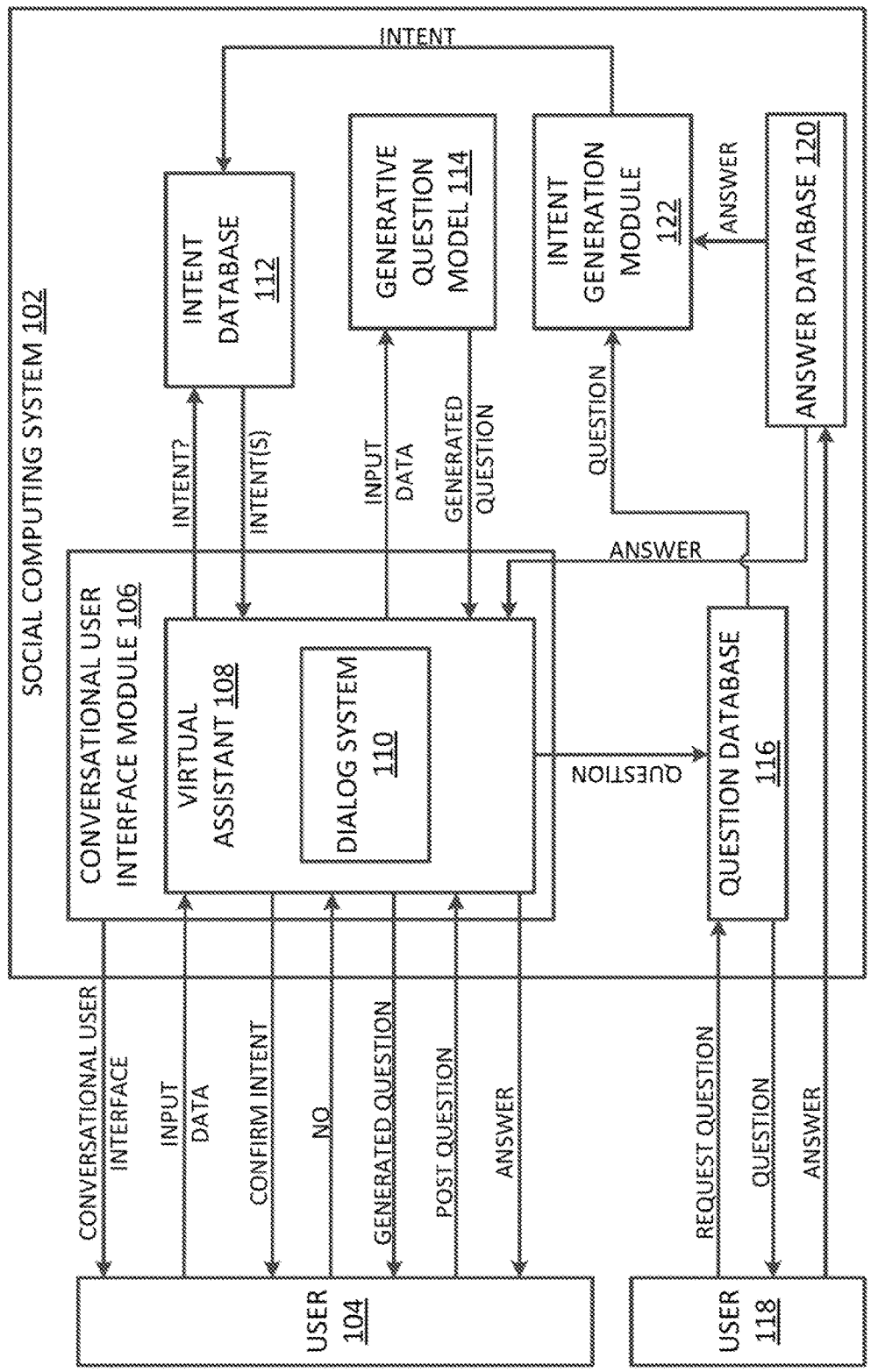
FIG. 1 depicts an example social computing system integrated with a conversational user interface for providing assistance to a user according to an embodiment.

Aspects of the present disclosure provide apparatuses, methods, processing systems, and computer readable mediums for providing support assistance to users with a conversational user interface integrated with a social computing system. The social computing system can include social question answering services and community question answering services.

An organization can implement a conversational user interface (CUI) integrated with a social computing system to provide support for a product and/or service offered by that organization, such as computer software program product. A social computing system (or a social computing environment) is an interactive environment that, in addition to providing assistance to users, can foster collaboration between users and promote innovation. The CUI integrated with the social computing system can include a trained virtual assistant. The trained virtual assistant is capable of interacting with the user via a dialog system as well as operating within the social computing system (e.g., accessing and adding data in the social computing system).

In one embodiment, a social computing system can provide a CUI to a user. For example, the user can request assistance from the social computing system, which can then provide the CUI. A user's request for assistance can include a question the user would like an answer to or a command for the virtual assistant to perform (e.g., retrieving a document, calculating a value, etc.). In some cases, a user that has a question (or a command) for a virtual assistant regarding a product and/or service offered by the organization can ask the virtual assistant by entering the question (e.g., input data) in the CUI.

Upon receiving the input data (e.g., a question or command), the virtual assistant determines with a dialog system which intent matches the user's request. An intent includes a set of phrases that a user might enter (e.g., as audio, video, or text data) and an action associated with the set of phrases for the virtual assistant to take (e.g., provide an answer, request additional information from the user, direct user to a human support agent, etc.). The dialog system provides a framework for the virtual assistant to communicate with the user and accesses an intent database to match user input to a phrase in an intent, in order to identify the virtual assistant action. For example, matching user input to a set of phrases in an intent can include identifying words and an order of the words from the user input (including similar words and word ordering) and comparing to each phrase in each intent to find the phrase in an intent most similar to the user input. By doing so, an action for the virtual assistant can be identified. In some cases, identifying an intent is based on a threshold value of similarity between the user input and each phrase of each intent. The similarity value can be a percentage value of words and word ordering (including similar words and word ordering) that the user input and a phrase have in common. If the similarity value of user input and a phrase in an intent meets (or exceeds) a threshold similarity value, then the action associated with the intent is identified for the virtual assistant to perform. In some cases, similarity metrics can be computed based on word embedding (e.g., fastText, Word2vec, etc.).

In some cases, the user input may not meet the threshold value for matching the input data to a single intent. For example, the user can enter an uncommon question, or the question is not articulated well, such as "monthly debit orders." As a result, the virtual assistant via the dialog system is not able to match the user input to a phrase in any intent. Instead, the virtual assistant can identify two or more intents that include phrases with some (but not all) words matching to the user input. For example, the virtual assistant can identify one phrase each from two or more intents that have a similarity value closest to the threshold value. In other cases, the user input may meet the threshold value for matching to a phrase in more than one intent. In such cases, the virtual assistant via the dialog system can present the two or more intents to the user. The virtual assistant can request the user to confirm whether any of the retrieved intents match what the user is requesting.

If the user selects either of the intents presented, then the virtual assistant performs the action associated with the intent. Additionally, the interaction is logged, and the intent is updated in the intent database to include the user phrase "monthly debit orders" with the selected intent. If the user indicates that neither intent is what the user meant, then the virtual assistant can provide the user input to a deep generative model (e.g., a generative question model) in the social computing system to transform the user input, using a long short-term memory model. For example, the generative question model can transform "monthly debit order" to a re-phrased user input "How do I calculate my monthly orders?" The generative question model can provide the new question to the virtual assistant to display to the user in the CUI. Upon confirmation from the user of re-phrased question, the virtual assistant can post the question in a question database of the social computing system for other users to answer. Prior to posting the question in the database, the virtual assistant can review the question database in the social computing system to determine whether there is a similar question in the question database (e.g., a previously generated question). If there is a similar question, the virtual assistant can determine whether there is a corresponding answer to the question in an answer database. In such instances, the virtual assistant is able to retrieve an answer for the user without having to post the question.

In some cases, where the question generated by the generative question model does not match to a question in the question database and/or no corresponding answer exists in the answer database, the virtual assistant can post the question on behalf of the user. By posting the question on behalf of the user, the virtual assistant is able to leverage the knowledge of users within the social computing system without requiring the user to be a member or account holder in the social computing system. In another example, the user can direct the virtual assistant to post the question in the user's name, using the credentials of the user. In some cases, the user can edit the generated question before the virtual assistant posts the question. In other cases, users who retrieve the question from the question database can edit the question in addition to providing an answer.

Once the question is posted in the question database, users of the social computing system can review the question and provide an answer. The virtual assistant can monitor the question database and answer database to determine when an answer is posted to the virtual assistant's question. When an answer is posted corresponding to the question posted, the virtual assistant retrieves the answer and provides the answer to the user in the CUI.

By integrating the conversational user interface with the social computing system, the number of fallbacks (e.g., failures) of the virtual assistant can be reduced, due to the virtual assistant accessing data within the social computing system and essentially crowdsourcing the generation of new intents for the virtual assistant. For example, the integration of the CUI and social computing system allows for the generation of new intents based on user inputs collected via the virtual assistant, questions generated from the generative question model, and corresponding answers from users of the social computing system. The question inputs and generated questions are clustered as the set of phrases, and the answer is the action the virtual assistant initiates (e.g., providing an answer, document, link). Once a new intent is generated, the intent is stored in an intent database, which the virtual assistant can access and retrieve when assisting users in the CUI.

Example Social Computing System Integrated with a Conversational User Interface

FIG. 1 depicts an exemplary social computing environment 100 in which a social computing system 102 integrated with a conversational user interface (CUI) provides assistance to users.

In one embodiment, the social computing system 102 can provide a CUI to assist users 104. The CUI is generated by a conversational user interface module 106. The conversational user interface module 106 generating the CUI includes a virtual assistant 108 and a dialog system 110. A CUI is a user interface that includes an instance of the virtual assistant 108 that interacts with a user 104 via the dialog system 110 to provide assistance. For example, the virtual assistant 108 is trained to answer questions posed by a user 104 or perform an action on behalf of the user 104. A user 104 can include a customer, potential customer, supplier, vendor, or another type of user interacting with the virtual assistant 108. In some cases, the CUI is provided to the user 104 upon request for assistance. In other cases, the CUI is automatically provided to the user 104 when accessing or logging into the social computing system 102.

Upon providing the CUI to user 104, the user 104 can interact with the virtual assistant 108 by entering input to the CUI. Input from a user 104 can include text data, video data, or audio data. In some cases, the input from the user 104 can be a question for the virtual assistant 108 to answer. In other cases, the input from the user 104 can be a command or task for the virtual assistant 108 to perform. After the virtual assistant 108 receives the user input data (e.g., question input or command input), the dialog system 110 of the virtual assistant 108 determines how the virtual assistant 108 should act or respond to the user 104. For example, the dialog system 110 can determine whether the input data from the user 104 matches a phrase in an intent.

An intent includes a set of phrases and a corresponding action. The set of phrases in an intent refers to phrase(s) that a user 104 might enter (e.g., as either audio, video, or text data) to the CUI for the virtual assistant. The action in an intent refers to how the virtual assistant is to respond to the user's 104 phrase, such as to provide an answer, request additional information from the user, direct user to a human support agent, etc. For example, the set of phrases can include "How do I download my previous year's tax returns?", "How can I download last year's tax returns?" and "How can I download my tax returns from last year?". In response to the user input data matching to one of the phrase, the virtual assistant 108 can respond to the user 104 by performing the action associated with the set of phrases, which can include, for example, providing an answer (e.g., step by step instructions) for downloading the tax return or a link for downloading tax returns.

If the user input matches the phrase of the intent, then the virtual assistant 108 performs the action associated with the intent. In some cases, determining whether the user input matches a phrase can be based on a similarity value (e.g., a percentage of words and word ordering in common) between the user input and phrase meeting (or exceeding) a threshold similarity value. In such instances, a number of words in common, a number of similar words in common, and word order are analyzed to determine how similar the phrase and user input are (e.g., determining a similarity value). In other cases, similarity metrics can be computed based on word embedding (e.g., fastText, Word2vec, etc.). If the user input does not match any of the phrases of intents stored in an intent database 112 (e.g., no single intent meets the threshold requirement), then the virtual assistant 108 retrieves two or more intents from the intent database 112 that include phrases close to the user input (and threshold requirement).

The intents that are retrieved from the intent database 112 and a description of the action and/or answer are displayed to the user 104 in the CUI. For example, the virtual assistant 108 can ask "Did you mean" with two or more intent descriptions displayed. For example, in response to receiving "monthly debit orders," the virtual assistant 108 can ask the user 104 if their intent was to "Calculate monthly expenses" or "Create new debit transaction." If the user 104 indicates that one of the intent descriptions is what the user 104 meant with their input, then the virtual assistant 108 initiates a course of action or displays an answer corresponding to the intent selected. If the user 104 indicates with a "No" that none of the intent descriptions displayed is what the user 104 meant, then the virtual assistant 108 triggers a generative question model 114 with an API call to generate a new question. In some cases, a chat bot (not depicted) of the social computing system 102 can receive a signal from the virtual assistant 108 to perform tasks such as instantiating the generative question model 114 to generate a question.

Once the generative question model 114 receives the signal from the virtual assistant 108, the generative question model 114 generates a new question based on the user input provided to the virtual assistant 108 in the CUI. The generative question model 114 is a deep generative model that can transform the user input using deep learning algorithms (e.g., long short-term memory models) and artificial neural networks. An artificial neural network (e.g., recurrent neural network) for creating the generative question model 114 is trained with data from within the social computing system 102 (e.g., posts, replies, click stream, user and vote tables, etc.). The generative question model 114 is implemented in the social computing system 102 using a deep learning library, such as PyTorch, TensorFlow, Caffe, Keras, or Microsoft Cognitive Toolkit. For example, the generative question model 114 can transform user input "monthly debit orders" to an articulated phrase "How do I calculate my monthly orders?"

The question generated by the generative question model 114 is provided to the virtual assistant 108. In some cases, prior to presenting the generated question to the user 104 for review, the virtual assistant 108 can access the question database 116 to determine whether the question generated is the same or similar to a question stored in the question database 116. For example, the virtual assistant 108 can map words (including similar words) and wording order of the generated question to questions stored in the question database 116. If the virtual assistant 108 determines there is a similar question stored in the question database 116, then the virtual assistant 108 determines if there is a corresponding answer stored in the answer database 120. For example, an answer in an answer database 120 can include an identifier corresponding to a question in the question database 116. If the virtual assistant 108 determines there is an answer in the answer database 120 corresponding to a question in the question database that is the same or similar to the question generated by the generative question model 114, then the virtual assistant 108 can retrieve and display the answer to the user 104 in the CUI.

In other cases, if the virtual assistant 108 is not able to find a same or similar question in the question database 116 with a corresponding answer, then the virtual assistant 108 can display the generated question to the user 104 in the CUI to review. For example, the virtual assistant 108 can display the generated question to the user 104 along with a note from the virtual assistant 108 requesting confirmation to post the generated question to the social computing system 102. In some cases, the generative question model 114 can generate more than one question. In such instances, each generated question can be reviewed by the virtual assistant 108 against the questions in the question database 116 before presenting to the user 104 to select. In other cases, the user 104 reviewing the generated question can edit the question before directing the virtual assistant 108 to post the question.

After the user 104 reviews the generated question, the user 104 can direct the virtual assistant 108 to post the question. In some cases, the user 104 can direct the virtual assistant 108 to post the question on their behalf in the social computing system 102. In doing so, the question posted in the social computing system 102 will appear to be from the virtual assistant 108 rather than the user 104. The user 104 can request the virtual assistant 108 to post on their behalf because the user 104 may not have an account associated with the social computing system 102 to post, the user 104 does not remember or does not want to provide their login information (e.g., user name and password) when posting the question, or the user 104 may not want to be associated with the question or may wish to remain anonymous. In other cases, the user 104 can provide the virtual assistant 108 the necessary credentials (e.g., user name, ID, password, etc.) and/or authorization to post the question in their name. For example, the user 104 may want to indicate their ownership of the question posted.

Once the virtual assistant 108 receives confirmation from the user 104 to post the question, the virtual assistant 108 posts the question in the social computing system 102 by storing the question in the question database 116. With the question stored in the question database 116, other users 118 can request or retrieve the question from the question database 116 to answer. Users 118 can include technical experts familiar with the product or service associated with the social computing environment 100, customers, potential customers, vendors, suppliers, or employees of the organization supporting the social computing system 102. In addition, users 118 can include trusted users who is a user 118 that has been granted special privileges within the social computing system 102. For example, the trusted user can modify a question and/or answer posted in the social computing system 102 or be assigned to monitor a separate queue or database in the social computing system. In such cases, a question can be added to a separate queue or database (not depicted) for expedited answering by trusted users assigned to the queue or database.

The user 118 can review the question posted and provide an answer to the question. In some cases, the user 118 can edit the question as well as provide an answer. The answer provided by the user 118 can be stored in the answer database 120. The virtual assistant 108 can monitor the answer database 120 to determine when an answer is provided corresponding to the question posted. For example, the question stored in the question database 116 can be indexed with a unique identifier. When an answer is retrieved corresponding to the question, the answer can include a reference to the unique identifier of the question answered.

Upon determining the question posted is answered within the social computing system 102, the virtual assistant 108, retrieves the answer and provides the answer to the user 104 in the CUI. In addition to leveraging the users 118 of the social computing system 102 to prevent a fallback of the virtual assistant 108, the users 118 of the social computing system 102 also assist in generating new intents so that the virtual assistant 108 can more efficiently assist user 104.

In some cases, the social computing system 102 includes an intent generation module 122. The intent generation module 122 requests within the social computing system 102 to receive a user input provided by user 104, question(s) generated by the generative question model 114, and answer(s) provided by the users 118 corresponding to the user input. In some cases, the intent generation module 122 can request answers from users 118 that are trusted users with granted privileges in the social computing system 102. For example, the intent generation module 122 can request questions and answers that are validated or flagged by trusted users. In such cases, a trusted user can validate a question and/or answer by editing or posting a question and/or answer to the social computing system 102. Additionally, a trusted user can flag a question for generating an intent. For example, the question (and corresponding user input, question modification, and answers) can indicate a new topic.

The intent generation module 122 groups (or clusters) the user input and questions generated as the set of phrases in an intent. Additionally, the intent generation module 122 identifies the answer generated by users 118 corresponding to a question (e.g., the flagged question) as the action in an intent. In some cases, if more than one answer is generated and/or retrieved, as each answer to questions in the set of phrases may be similar to other, with differences primarily in the quality of the answer. In such cases, the intent generation module 122 can identify the answer with the highest quality metrics (e.g., readability score, accuracy score, up votes, clicks, etc.). The answer with the highest quality metrics is associated with the set of phrases as the action in order to create an intent. The new intent is stored in the intent database 112 associated with the dialog system 110 and can be used by the virtual assistant 108. In such cases, trusted users can validate the set of phrases (e.g., questions) and action (e.g., answer) before a new intent is added to the intent database 112. For example, a new intent generated by the intent generation module 122 can be displayed to a trusted user for review. If the trusted user is satisfied with the intent, the trusted user can indicate the new intent is valid for submission to the intent database 112.

In some cases, a user 104 can provide input associated with a command for the virtual assistant 108 to perform. If the virtual assistant 108 determines via the dialog system 110 that there is no matching intent, and the user 104 indicates that none of the similar intents retrieved from the intent database 112 indicate what the user 104 meant, then a generative model (not depicted) can generate a newly phrased command for the user to review based on the user input provided to the virtual assistant 108 in the CUI. When the user 104 confirms the new command, the virtual assistant 108 determines whether it can perform the command. If the virtual assistant 108 does not have the training to perform the command, then the virtual assistant 108 can request and receive instructions from users 118 on how to perform the command.

Once the virtual assistant 108 receives instructions, the virtual assistant 108 performs the command for the user 104. The instructions received from users 118 are received by the intent generation module 122 along with the command generated and user input from user 104 to generate a new intent to store in the intent database 112, so in the future, the virtual assistant 108 can perform the command for another user without having to request instructions from users 118 in the social computing system 102.

Example Block Diagram of an Intent Generator

Figure 2:
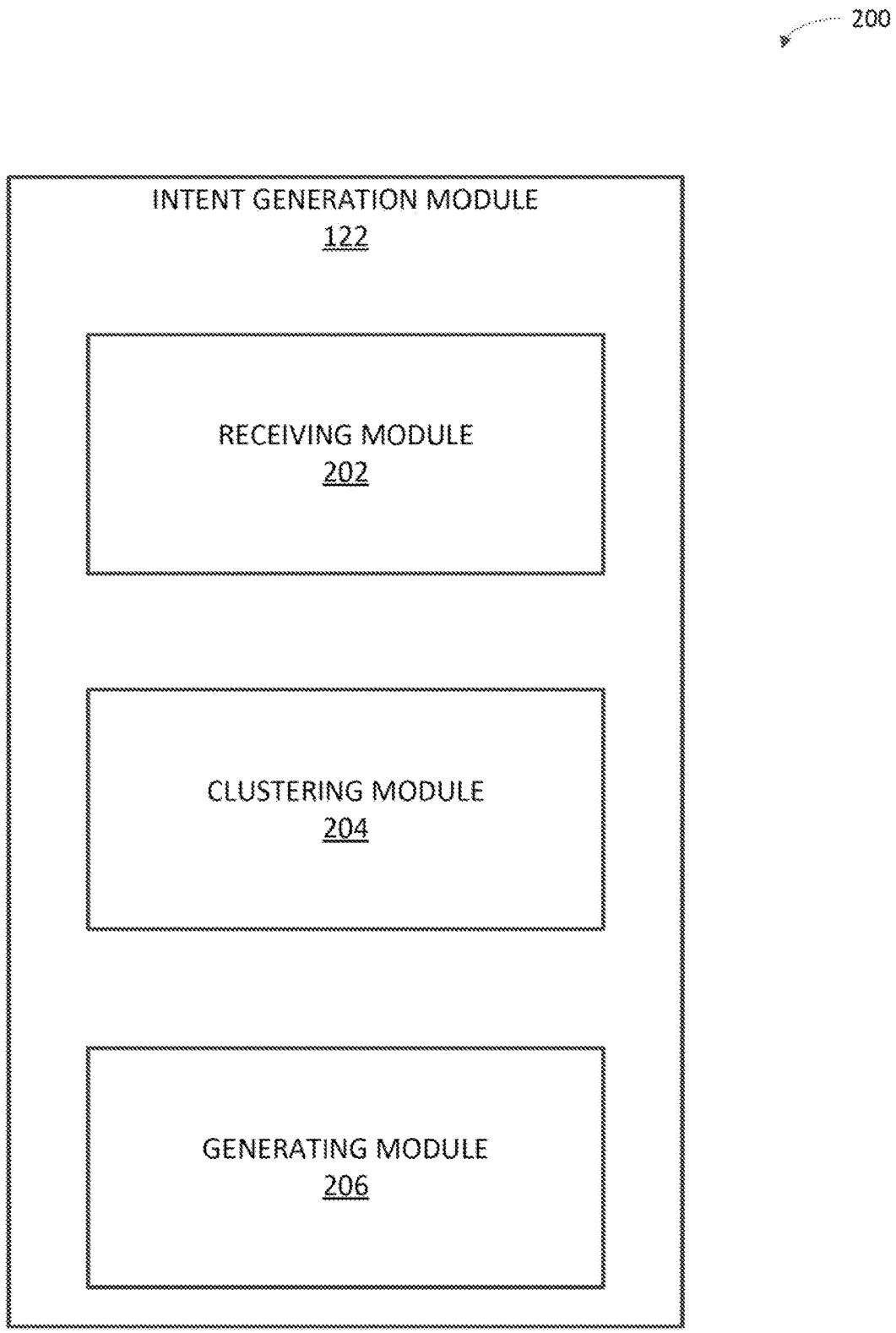
FIG. 2 depicts an example of a block diagram of an intent generator according to an embodiment.

FIG. 2 depicts an example block diagram 200 of an intent generator (e.g., an intent generation module 122).

The intent generation module 122 is included in a social computing system integrated with a conversational user interface. In such a system, the virtual assistant of the conversational user interface can leverage the resources of the social computing system when providing assistance to users. Included in leveraging the social computing system is the intent generation module 122. The intent generation module 122 includes a receiving module 202, a clustering module 204, and a generating module 206.

The receiving module 202 receives from within the social computing system the user input from the CUI, the question(s) generated based on the user input, any edits and/or modifications to the generated question(s), and the answer(s) generated by users of the social computing system. In some cases, the receiving module 202 receives an indication that the virtual assistant is not able to respond to the user. For example, the indication can be from a trusted user. In another example, the indication can be based on a number of instances the virtual assistant is not able to respond to a user meeting a threshold value. After obtaining the data from within the social computing system, the receiving module 202 then signals the clustering module 204 to group together similar user inputs and associated generated question(s), including modified questions using clustering models. Two or more users interacting with the virtual assistant can have similar user inputs, resulting in one or more similar generated questions and corresponding answer(s).

Once the number of user inputs and/or generated questions reach a threshold value, then the generating module 206 can generate an intent so that going forward the virtual assistant need only retrieve the intent from an intent database. In some cases, the threshold value can be one instance of user input and/or generated question. The generating module 206 generates the intent by taking a group of similar user inputs and generated questions to be the set of phrases for the intent. Additionally, the generating module 206 identifies the answer corresponding to user input and the generated question as the action of the intent. In some cases, there may be more than one answer. In such cases, while the answers are likely to be similar (since answering similar questions), the generating module 206 can identify the answer with the highest quality metric and associate the answer with the highest quality metric as the action for the virtual assistant.

After grouping the set of phrases and identifying the action, the generating module 206 generates the intent by associating the set of phrases with the action. The intent generated by the generating module 206 can be stored in an intent database. In some cases, the intent generating module 122 can generate an intent based on only validated questions and answers from trusted users. For example, a trusted user can validate inputs to the social computing system (e.g., questions and answers) by editing or posting a question and/or answer to the social computing system.

Example Conversational User Interface

Figure 3:
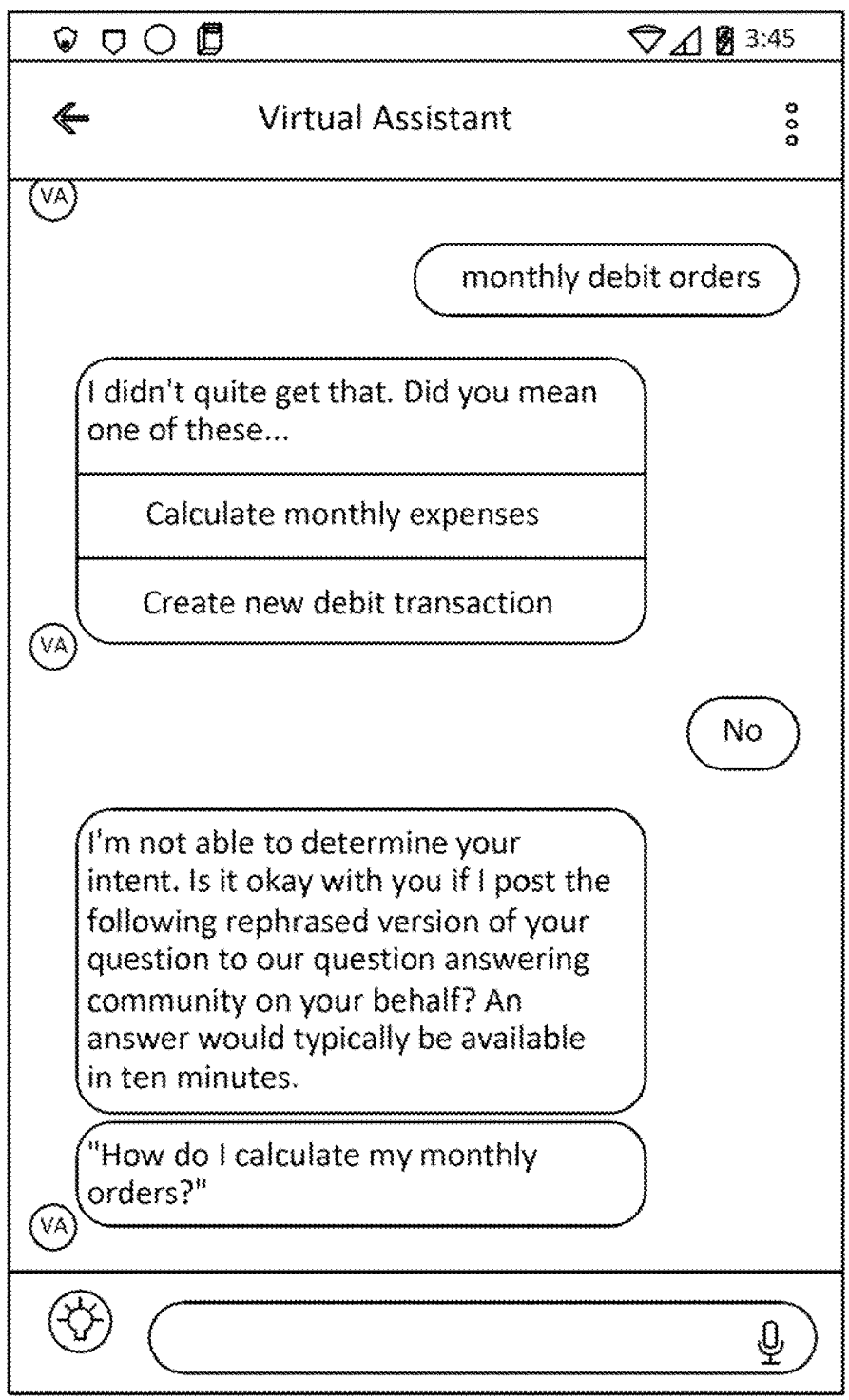
FIG. 3 depicts an example conversational user interface displayed to a user for assistance according to an embodiment.

FIG. 3 depicts an example conversational user interface 300 for providing assistance to a user. The conversational user interface 300 displayed to the user includes a virtual assistant and is integrated with a social computing system. As illustrated, the conversational user interface includes a text box at the bottom of the user interface for the user to enter their input. There is also the option of providing audio input data, as indicated by the microphone within the text box. The conversation is depicted in the CUI (similar to a text message thread), with the user's input displayed on the right in the CUI and the virtual assistant's statements displayed on the left. In some cases, the conversation between the user and virtual assistant can be depicted in a different format (e.g., different text, font, dialog placement, etc.).

As depicted, the user has provided input of "monthly debit orders." The virtual assistant in analyzing the user input is not able to find an intent that matches the user input as indicated by the dialog from the virtual assistant stating, "I didn't quite get that. Did you mean one of these . . . " Along with the virtual assistant's statement are two intents that the virtual assistant retrieved from an intent database as being similar or close to the user input. For example, the intents provided "Calculate monthly expenses" and "Create new debit transactions" share at least one word in common with the user input.

After presenting to the user the different intents, the user indicates as "No" that neither intent is what the user meant by "monthly debit orders." As a result, the virtual assistant triggers a new question to be generated (e.g., by a generative model) based on the user input and provides the following statements to the user: "I'm not able to determine your intent. Is it okay with you if I post the following rephrased version of your question to our question answering community on your behalf. An answer would typically be available in ten minutes." and "How do I calculate my monthly orders?" At this point the user has the option in the conversational user interface to accept the rephrased question. In some cases, the user can modify the generated question. In other cases (not depicted), the user can request the virtual assistant to post the question in the user's name or in the virtual assistant's name.

Additionally, in some cases, the virtual assistant can estimate when an answer will be available and provide an indication of the estimate to the user. The estimate can be based on previous postings made to the social computing system (e.g., "question answering community").

Example Conversational User Interface

Figure 4:
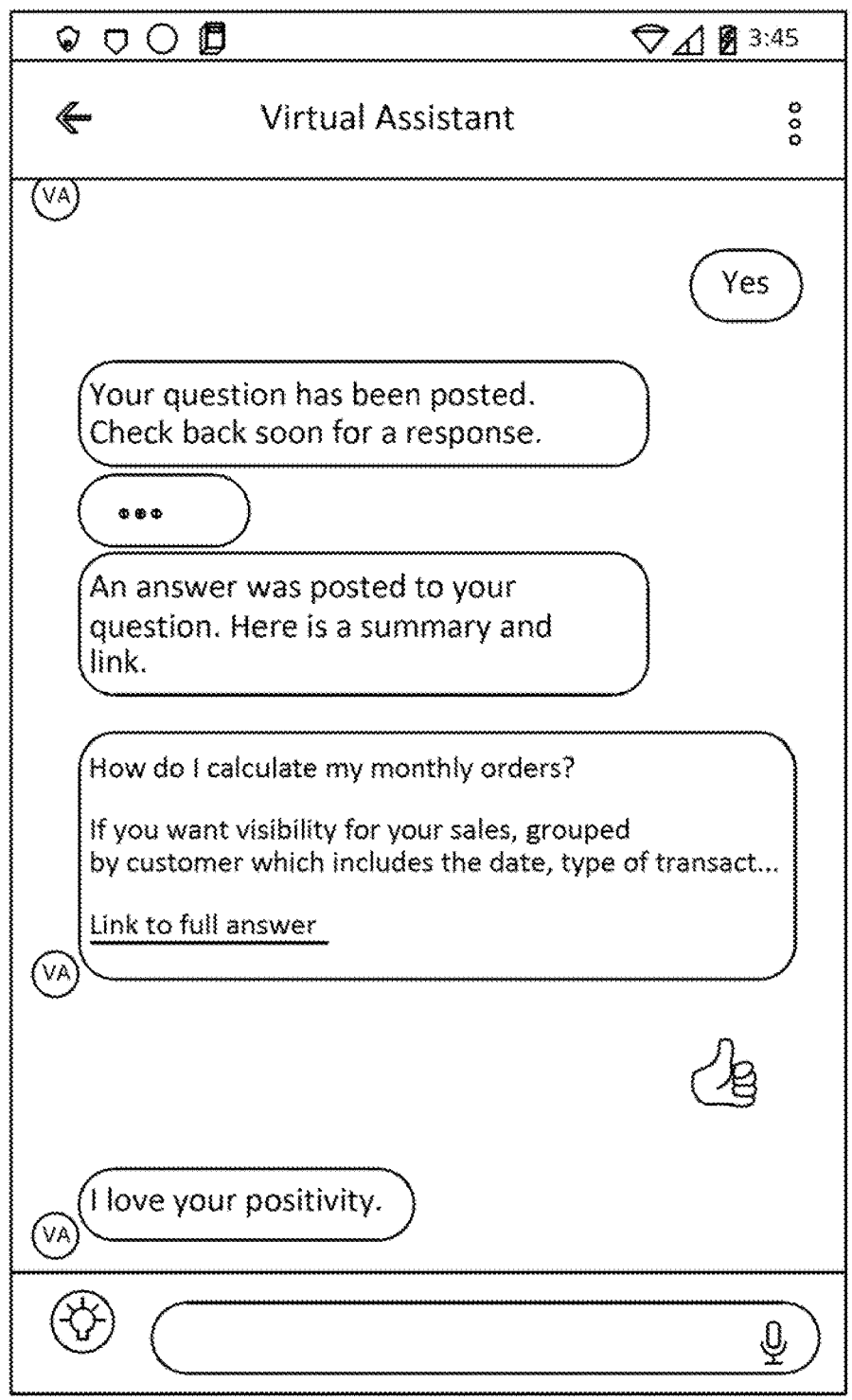
FIG. 4 depicts an example conversational user interface displayed to a user for assistance according to an embodiment.

FIG. 4 depicts an example conversational user interface 400 for providing assistance to a user. The example conversational user interface 400 continues with the interaction of the user and virtual assistant described in FIG. 3. After providing the rephrased question to the user, the user can indicate "Yes" to the virtual assistant to post the question. Once the virtual assistant posts the question, the virtual assistant provides the following statement to the user, "Your question has been posted. Check back soon for a response."

In addition, the virtual assistant includes an ellipses (" . . . ") indicating the virtual assistant is waiting for an answer to be provided in the social computing system. Once an answer is provided in the social computing system, the virtual assistant indicates to the user "An answer was posted to your question. Here is a summary and link" along with a brief summary and link to the full answer.

As depicted the user after receiving an answer responds to the virtual assistant with a thumbs up emoji, indicating "good," "great," or "good job" to the virtual assistant. The virtual assistant is capable of interpreting the emoji and responds to the user with "I love your positivity."

Figure 5:
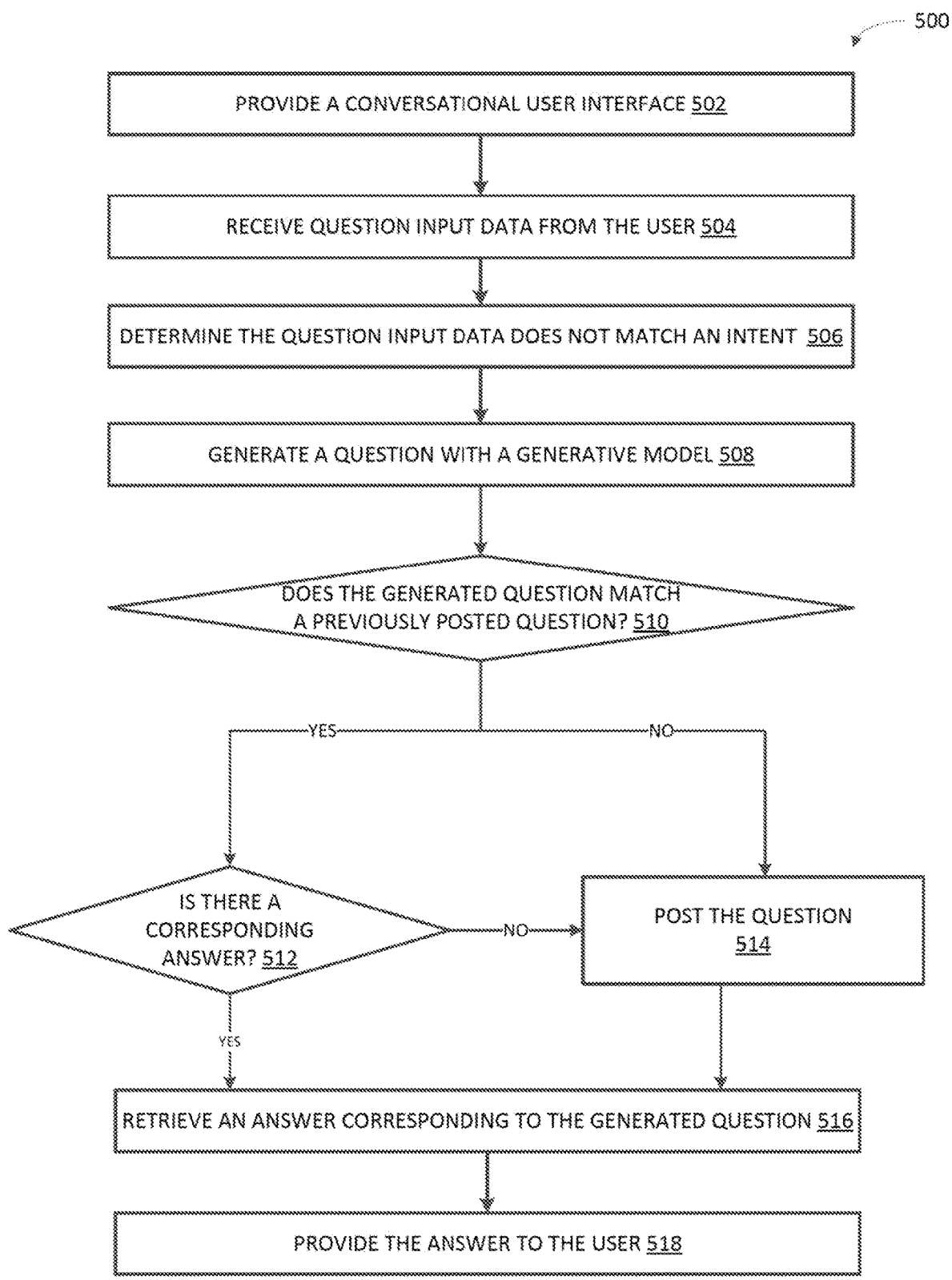
FIG. 5 depicts a flow diagram for providing assistance to a user with a conversational user interface integrated with a social computing system according to an embodiment.

Example Method for Providing Assistance to a User with a Conversational User Interface Integrated with Social Computing System FIG. 5 depicts an example method 500 for providing assistance to a user with a conversational user interface integrated with a social computing system, as described with respect to FIGS. 1-4.

At 502, a social computing system provides a CUI to a user. The CUI provided to the user includes an instance of the virtual assistant integrated with the social computing system as well as a dialog system. The dialog system includes the framework for the user to interact with the virtual assistant.

At 504, the social computing system receives input from the user. In some cases, the social computing system receives a question (e.g., question input, input data, etc.) from the user to the virtual assistant via the CUI for the virtual assistant to answer. In other cases, the social computing system receives a command (or command input) from the user to the virtual assistant via the CUI for the virtual assistant to perform.

At 506, the social computing system determines the input data does not match an intent. In some cases, the virtual assistant in the social computing system determines via the dialog system that the input data does not meet a threshold value of similarity to any phrase associated with intents in an intent database. In such cases, the virtual assistant determines via the dialog system two or more phrases from different intents that are closest to meeting the threshold value and provides the two or more intents to the user. The user can then review the intents provided. If the user selects one of the presented intents, then the virtual assistant performs the associated task and the dialog system updates the selected intent in the intent database with the user's input data. If the user does not select any of the presented intents, the method continues at 508.

At 508, the social computing system generates a question from the input data with a generative model. For example, the virtual assistant can provide the user input to a generative question model, which can transform the user input to a new question using deep learning algorithms (e.g., long short-term memory model). In some cases, the social computing system (e.g., the virtual assistant integrated with the social computing system) can determine at 510 whether the generated question matches any question previously posted in the social computing environment by accessing a question database of the social computing system and reviewing the questions. For example, if the virtual assistant determines there is a question that matches the generated question, then at 512 the virtual assistant determines if there is an answer corresponding to the question. If there is a corresponding answer, then the virtual assistant proceeds to 516 to retrieve the answer and 518 to provide the answer to the user.

However, if there is no corresponding question and/or answer, the virtual assistant provides the generated question to the user in the CUI and requests confirmation to post the generated question. In some cases, the user can edit the question. In other cases, the user can confirm posting the generated question in the virtual assistant's name. As such, the user can post questions anonymously. In still other cases, the user can confirm posting the generated question in the user's name by providing the virtual assistant the user's credentials to the social computing system. Upon receiving confirmation from the user, the virtual assistant at 514 can post the generated question for other users to review and/or answer in the social computing system.

At 516, the social computing system retrieves an answer corresponding to the generated question. In some cases, the social computing system can retrieve a corresponding answer without having to post the question, as described in 508-512. In other cases, the virtual assistant can post the question in the social computing system (e.g., either in the virtual assistant's name or the user's name), as described at 514, and monitor the question and answer databases for when other user(s) retrieve the question and provide an answer. In some cases, the virtual assistant can provide in the CUI an estimated time to expect an answer to the question posted. In such cases, the estimated time can be calculated by the virtual assistant based on previous interactions within the social computing system. The virtual assistant can determine an answer is provided by another user for a posted question based on a unique identifier associated with the question and referenced by the answer provided. Once an answer is provided to the social computing system, the virtual assistant retrieves the answer for the user.

At 512, the social computing system provides the answer to the user. For example, the virtual assistant can display the answer (e.g., a summary description of the answer and a direct link to the full answer in the social computing system) in the CUI.

Figure 6:
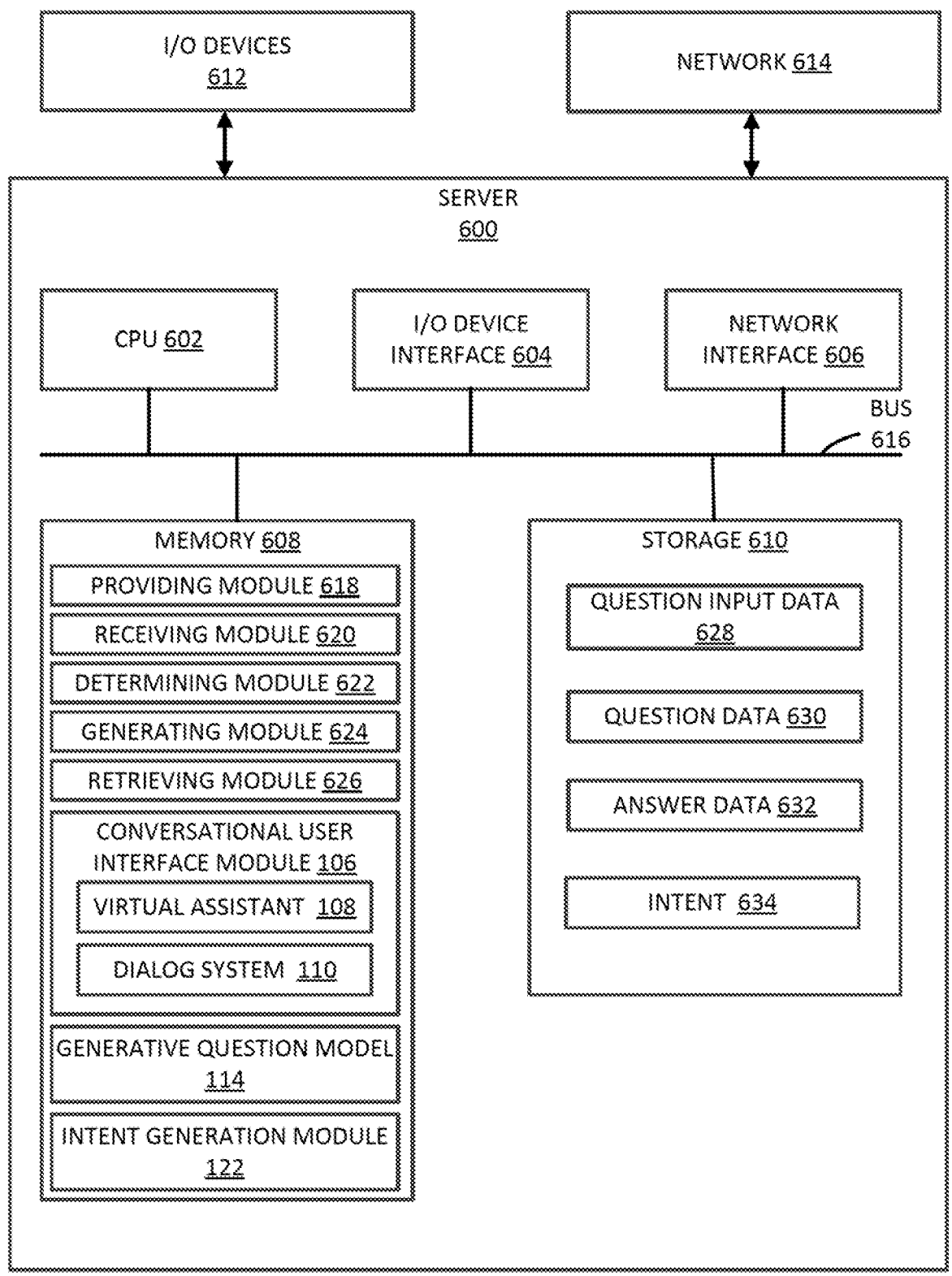
FIG. 6 depicts an example server in the social computing system integrated with a conversational user interface to provide assistance to users according to an embodiment.

Example Server in the Social Computing System Integrated with Conversational User Interface FIG. 6 depicts an example server 600 in the social computing system integrated with conversational user interfaces that may perform the methods described herein, such as the method for providing assistance to users described with respect to FIGS. 1-5.

Server 600 includes a central processing unit (CPU) 602 connected to a data bus 616. CPU 602 is configured to process computer-executable instructions, e.g., stored in memory 608 or storage 610, and to cause the server 600 to perform methods described herein, for example with respect to FIGS. 1-5. CPU 602 is included to be representative of a single CPU, multiple CPUs, a single CPU having multiple processing cores, and other forms of processing architecture capable of executing computer-executable instructions.

Server 600 further includes input/output (I/O) device(s) 612 and interfaces 604, which allows server 600 to interface with input/output devices 612, such as, for example, keyboards, displays, mouse devices, pen input, and other devices that allow for interaction with server 900. Note that server 600 may connect with external I/O devices through physical and wireless connections (e.g., an external display device).

Server 600 further includes a network interface 606, which provides server 600 with access to external network 614 and thereby external computing devices.

Server 600 further includes memory 608, which in this example includes a providing module 618, receiving module 620, determining module 622, generating module 624, retrieving module 626, conversational user interface module 106 (including a virtual assistant 108 and a dialog system 110), generative question model 114, and intent generation module 122 for performing operations described in FIGS. 1-5.

Note that while shown as a single memory 608 in FIG. 6 for simplicity, the various aspects stored in memory 608 may be stored in different physical memories, including memories remote from server 600, but all accessible by CPU 602 via internal data connections such as bus 616.

Storage 610 further includes question input data 628, which may be like question input received from a user, as described in FIGS. 1-3, and 5.

Storage 610 further includes question data 630, which may be like the question generated by the generative question model 114, as described FIGS. 1-5.

Storage 610 further includes answer data 632, which may be like the answer provided by users associated with the social computing system, as described FIGS. 1-5.

Storage 610 further includes intent 634, which may be like the intents generated by the intent generation module 122.

While not depicted in FIG. 6, other aspects may be included in storage 610.

As with memory 608, a single storage 610 is depicted in FIG. 6 for simplicity, but various aspects stored in storage 610 may be stored in different physical storages, but all accessible to CPU 602 via internal data connections, such as bus 616, or external connection, such as network interfaces 606. One of skill in the art will appreciate that one or more elements of server 600 may be located remotely and accessed via a network 614.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates the transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During the execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein but are to be accorded the full scope consistent with the language of the claims. Within a claim, a reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving an indication that a virtual assistant integrated with a social computing system is not able to respond to a user;
   obtaining input data from the user interacting with the virtual assistant and a set of generated content that includes a set of questions and a set of answers stored in the social computing system;
   determining a subset of questions from the set of questions based on the input data, wherein each question in the subset of questions includes a validation indication from a trusted user with privileges that is associated with the social computing system;
   identifying an answer from a subset of answers of the set of answers corresponding to the subset of validated questions from the set of questions, wherein each answer in the subset of answers includes a validation indication from the trusted user; and
   generating an intent for the virtual assistant by associating the answer from the subset of answers with the subset of validated questions from the set of questions.

2. The method of claim 1, wherein the method further comprises: providing the generated intent to the virtual assistant.

3. The method of claim 1, wherein the indication that the virtual assistant is not able to respond to the user is based on a number of input data meeting a threshold value.

4. The method of claim 1, wherein the method further comprises: receiving the indication that the virtual assistant is not able to respond to the user from a trusted user to generate the intent.

5. The method of claim 1, wherein identifying the answer includes determining the answer from the subset of answers with a highest quality metric.

6. The method of claim 1, wherein determining the subset of questions that includes the input data is based on implementing a clustering model.

7. The method of claim 1, wherein the subset of questions includes generated by a generative question model.

8. The method of claim 1, further comprising:
   providing the generated intent to a trusted user for validation;
   receiving the validation of the intent from the trusted user; and
   storing the validated intent in an intent database.

9. The method of claim 1, wherein each question in the subset of questions includes a new topic indication from the trusted user.

10. A system, comprising:
    a processor; and
    a memory storing instructions which when executed by the processor perform a method comprising:
       receiving an indication that a virtual assistant integrated with a social computing system is not able to respond to a user;
       obtaining input data from the user interacting with the virtual assistant and a set of generated content that includes a set of questions and a set of answers stored in the social computing system;
       determining a subset of questions from the set of questions based on the input data, wherein each question in the subset of questions includes a validation indication from a trusted user with privileges that is associated with the social computing system;

identifying an answer from a subset of answers of the set of answers corresponding to the subset of validated questions from the set of questions, wherein each answer in the subset of answers includes a validation indication front the trusted user; and generating an intent for the virtual assistant by associating the answer from the subset of answers with the subset of validated questions from the set of questions.

11. The system of claim 10, wherein the method further comprises: providing the generated intent to the virtual assistant.

12. The system of claim 10, wherein the indication that the virtual assistant is not able to respond to the user is based on a number of input data meeting a threshold value.

13. The system of claim 10, wherein the method further comprises: receiving an indication that the virtual assistant is not able to respond to the user from a trusted user to generate the intent.

14. The system of claim 10, wherein identifying the answer includes determining the answer from the subset of answers with a highest quality metric.

15. The system of claim 10, wherein determining the subset of questions that includes the input data is based on implementing a clustering model.

16. The system of claim 10, wherein the subset of questions includes questions generated by a generative question model.

17. The system of claim 10, wherein the method further comprises:
providing the generated intent to a trusted user for validation;
receiving the validation of the intent from the trusted user; and
storing the validated intent in an intent database.

18. The system of claim 10, wherein each question in the subset of questions includes a new topic indication from the trusted user.

19. A method comprising:
retrieving, based on receipt of an indication to generate an intent in a social computing system integrated with a conversational user interface:
user input data from a first set of users interacting with a virtual assistant of the conversational user interface, wherein the user input data corresponds to a set of instances of the virtual assistant not able to respond to the first set of users,
a set of questions based on the user input data, wherein each question in the set of questions includes a validation indication from at least one user in a second set of users with privileges interacting with the social computing system and a subset of the set of questions is generated via a generative question model of the social computing system, and
a set of answers from the first set of users interacting with the social computing system, wherein each answer in the set of answers is validated by the at least one user in the second set of users and the set of answers corresponds to the set of questions;
generating a set of phrases of the intent based on:
initiating a clustering model to group the user input data and the set of questions, and
determining a number of instances of the user input data in the group meets a threshold value;
generating an action of the intent based on:
identifying an answer from the set of answers with a highest quality metric, wherein the answer is the action of the intent; and
generating the intent by associating the set of phrases of the intent with the action of the intent.

20. The method of claim 19, wherein the indication to generate the intent when the virtual assistant is not able to respond is received from the at least one user from the second set of users.

* * * * *